United States Patent
Gupta et al.

(10) Patent No.: US 11,162,009 B2
(45) Date of Patent: Nov. 2, 2021

(54) LUBRICANT ADDITIVES FOR WATER BASED DRILLING FLUID

(71) Applicant: GUMPRO DRILLING FLUID PVT. LTD., Maharashtra (IN)

(72) Inventors: Vivek Gupta, Mumbai (IN); Sakshi Indulkar, Maharashtra (IN); Megha Asrani, Maharashtra (IN)

(73) Assignee: Gumpro Drilling Fluid PVT. LTD.

( * ) Notice: Subject to any disclaimer, the term of this patent is extended or adjusted under 35 U.S.C. 154(b) by 352 days.

(21) Appl. No.: 16/012,567

(22) Filed: Jun. 19, 2018

(65) Prior Publication Data

US 2019/0136112 A1 May 9, 2019

Related U.S. Application Data

(63) Continuation-in-part of application No. 15/094,752, filed on Apr. 8, 2016, now Pat. No. 10,407,607.

(60) Provisional application No. 62/153,398, filed on Apr. 27, 2015.

(30) Foreign Application Priority Data

Apr. 8, 2015 (IN) .......................... 1468/MUM/2015

(51) Int. Cl.
 C09K 8/22 (2006.01)
 C09K 8/16 (2006.01)
 E21B 3/00 (2006.01)
 E21B 21/00 (2006.01)
 C09K 8/20 (2006.01)
 C09K 8/24 (2006.01)

(52) U.S. Cl.
 CPC ................ C09K 8/22 (2013.01); C09K 8/16 (2013.01); C09K 8/206 (2013.01); C09K 8/24 (2013.01); E21B 3/00 (2013.01); E21B 21/00 (2013.01); C09K 2208/34 (2013.01)

(58) Field of Classification Search
 CPC . C09K 8/16; C09K 8/22; C09K 8/206; C09K 8/24; C09K 2208/34
 See application file for complete search history.

(56) References Cited

U.S. PATENT DOCUMENTS

| | | |
|---|---|---|
| 3,048,538 A | 8/1962 | Rosenberg et al. |
| 4,155,870 A | 5/1979 | Jorgensen |
| 2,946,746 A | 7/1980 | Keller |
| 4,233,162 A | 11/1980 | Carney |
| 4,374,737 A | 7/1983 | Larson et al. |
| 4,508,628 A | 4/1985 | Walker et al. |
| 4,544,756 A | 10/1985 | Patel |
| 4,569,694 A | 2/1986 | Spitz et al. |
| 4,786,432 A | 11/1988 | Kanfer et al. |
| 4,802,998 A | 2/1989 | Mueller et al. |
| 4,956,104 A | 9/1990 | Cowen et al. |
| 5,045,593 A | 9/1991 | Cowen et al. |
| 5,096,883 A | 3/1992 | Mercer et al. |
| 6,439,394 B1 | 8/2002 | Eiderman et al. |
| 6,461,999 B1 | 10/2002 | Fanta et al. |
| 6,528,594 B1 | 3/2003 | Bauer et al. |
| 6,620,770 B1 | 9/2003 | Kisner et al. |
| 8,393,411 B2 | 3/2013 | Dupriest et al. |
| 2004/0055747 A1 | 3/2004 | Lee |
| 2004/0171498 A1 | 9/2004 | Miller |
| 2005/0037929 A1 | 2/2005 | Kisner et al. |
| 2005/0137093 A1 | 6/2005 | Miller |
| 2006/0019834 A1* | 1/2006 | Melbouci ................ C09K 8/04 507/100 |
| 2007/0167333 A1 | 7/2007 | Hurd et al. |
| 2015/0129217 A1 | 5/2015 | Vorderbruggen et al. |

FOREIGN PATENT DOCUMENTS

WO    WO 89/11516    11/1989

OTHER PUBLICATIONS

Pennsylvania Perlite Corporation; "Perlite (All Grades);" Safety Data Sheet—16 Sections; (Jan. 10, 2018); 6 pages.

* cited by examiner

*Primary Examiner* — Aiqun Li
(74) *Attorney, Agent, or Firm* — Thorpe North & Western

(57) ABSTRACT

The invention relates to powdered lubricants for water based drilling fluids. Conventional liquid lubricants containing particularly divalent ions have the tendency to grease out. The powdered lubricants have excellent dispersion properties and hence do not grease out, when added to the drilling mud in the concentrations, preferably of the order of about 3% or less. The powdered lubricant is a combination of inert fillers with fatty acids that are essentially free from fatty acid esters and metal soaps and have organic acids containing C10-C24 alkyl groups fatty acids. The improved lubricating properties of the drilling muds result in greatly increased life of the rotary drilling bits and marked reduction in torque required to rotate the bit. Solid powdered additives compositions greatly reduce transportation costs and simplify the logistics and environmental concerns associated with shipping large volumes of liquids and overcome the pour point issues associated with liquid additives.

8 Claims, No Drawings

LUBRICANT ADDITIVES FOR WATER BASED DRILLING FLUID

RELATED APPLICATIONS

This application is a continuation-in-part application of U.S. application Ser. No. 15/094,752, filed Apr. 8, 2016 which claims priority to Indian Provisional Application No. 1468/MUM/2015, filed Apr. 8, 2015 and to U.S. Provisional Application No. 62/153,398, filed Apr. 27, 2015 which are each incorporated herein by reference.

FIELD OF THE INVENTION

The present invention relates to powdered lubricant additive compositions comprising a liquid lubricant blended with inert solid substrate. The solid lubricant additive compositions thus obtained are advantageously employed in drilling fluids.

BACKGROUND OF THE INVENTION

Drilling fluids are used during drilling of an oil well in rotary drilling. Two types of drilling fluids are mainly utilized, water based drilling fluids and oil based drilling fluids. Water based drilling fluids utilise water as base fluid and in oil based drilling fluids, oil is used as the base fluid. Various types of water based and oil based drilling fluids are developed and utilized in drilling operations.

Drilling fluids have many functions, such as removing drill cuttings from the drill area and carrying them to the surface where they can be separated. Drilling fluids also form a filter cake to seal and prevent fluid losses to stabilize the well bore. Drilling fluids additionally provide mud weights to balance the differential pressure, cool the drill bits and provide lubricity. Various types of additives are used to impart these properties to drilling fluids.

Lubricants are added to drilling fluids to reduce the torque and drag caused by friction between drill string, drill bit and formation. Many types of lubricants have been developed and utilised in drilling fluids. Lubricants can either be in solid or liquid form. Liquid lubricants such as hydrocarbons, fatty acid esters, fatty acids, surfactants and many other organic compounds are developed and used in the manufacture of conventional lubricant additives. Solid lubricants such as graphite, hollow glass beads, spherical solid particulates and polymers have been developed and utilized in drilling fluids. However, solid lubricants have many limitations, such as stability under pressure of hollow glass beads and problems in fluid formulations in graphite due to high surface area. Additionally, the size of the particulates creates problems for sifting with screen shakers. Another disadvantage noted is that large amounts of solid lubricants are required to impart reasonable lubricity to drilling fluids, thereby increasing the cost of production.

Liquid lubricants have their own shortcomings such as, handling in cold weather and logistic and environmental impacts.

When liquid lubricants containing fatty acids, sulfurized fatty acids, soaps of sulfurized and non-sulfurized fatty acids and esters of fatty acids are contaminated with monovalent or divalent ions, insoluble alkali monovalent or divalent ion soaps are formed and separate from the drilling mud. The greasing out of the alkali metal ion soap causes severe impediments to the control of the mud. If such greasing out occurs in drilling muds containing weighing agents, the greasing out causes accumulation of the weighing agent, which then sinks to the bottom of the mud pit, and is lost from the mud system. The resulting loss of mud density may cause blow out of the well.

It is observed that when drilling mud containing monovalent or divalent ions is free of weighting agents, the resulting insoluble soap floats on the surface of the mud in the mud pit. This insoluble calcium soap plugs the shale shaker and thereby interferes with the separation of the cuttings from the drilling mud. This further results in the extreme pressure additive not being drawn up by the mud pumps and incorporated in the drilling mud for circulation to the bit for lubrication.

With respect to lubricants and other additives used in water based drilling fluids, various formulations are described in the art.

U.S. Pat. No. 3,048,538 describes a water-base drilling fluid having extreme pressure lubricating properties consisting essentially of water and an extreme pressure lubricant additive selected from the group consisting of fatty acids having at least 8 carbon atoms per molecule, sulfurized fatty acids having at least 8 carbon atoms per molecule, alkali metal soaps of fatty acids and alkali metal soaps of sulfurized fatty acids, available calcium ions in a concentration above about 150 parts per million high enough to form insoluble curds of calcium soap, and a non-ionic surface active agent selected from the group consisting of polyoxyethylene derivatives of alkyl phenols, polyoxyethylene derivatives of alkyl glycols, and polyoxyethylene derivatives of anhydroalkitol esters in a concentration adequate to disperse the calcium soap in the drilling fluid.

Though the lubricant additive of U.S. Pat. No. 3,048,538 is meant to disperse the calcium soap in the drilling fluid, the use of surface active agents to prevent greasing could result in foaming and be detrimental to the stability of the drilling fluid. Further, U.S. Pat. No. 3,048,538 does not describe a powder-form lubricant additive as the present invention.

U.S. Pat. No. 4,802,998 describes powder-form lubricant additives for water-based drilling fluids which include highly dispersed silica's, one or more fatty acid alkyl esters of the formula $R^1 COOR^2$ (I) and, optionally, other additives known for lubricating purposes, and the use of these powder-form additives in drilling fluids for oil well and mine drilling.

Though the lubricant additive of U.S. Pat. No. 4,802,998 is in powder-form, it contains fatty acid alkyl esters and may contain metal soaps, both of which are not known to cause greasing out of the drilling fluid. The powder-form lubricant additive of U.S. Pat. No. 4,802,998 in effect, does not provide solutions to the problem of greasing out that is solved by the present invention.

SUMMARY OF THE INVENTION

The invention relates to powdered lubricants for water based drilling fluids. Conventional liquid lubricants containing particularly divalent ions have the tendency to grease out. The powdered lubricants have excellent dispersion properties and hence do not grease out, when added to the drilling mud in the concentrations, preferably of the order of about 3% or less. This invention resides in water based drilling mud compositions containing fatty acids, rosin acids and the sulfurized derivatives of the compounds named above in concentrations sufficient to impart lubricating properties to drilling muds. The powdered lubricant is a combination of inert fillers with fatty acids that are essentially free from fatty acid esters and metal soaps and have organic acids containing C10-C24 alkyl groups fatty acids. The improved lubricating properties of the drilling muds result in greatly increased life of the rotary drilling bits and marked reduction in torque required to rotate the bit. Solid powdered additives compositions greatly reduce transportation costs and simplify the logistics and environmental concerns associated with shipping large volumes of liquids and overcome the pour point issues associated with liquid additives.

The present invention describes a powdered lubricant additive that does not grease or cheese out in the presence of mono, di or trivalent ions in water based drilling fluids. The powdered lubricant additive includes a combination of fatty acids with inert fillers. The fatty acids are essentially free from fatty acid esters and metal soaps, said fatty acids having organic acids containing C10-C24 alkyl groups fatty acids.

The present invention further envisages a water-based drilling fluid having lubricating properties comprising water, viscosifiers, weighing agents, fluid loss control agents, calcium ions in concentration greater than 150 parts per million and the powdered lubricant additive described above.

The present invention also contemplates a rotary method for drilling a well through calcium-containing formations in which the water based drilling fluid as described above is circulated down the well, said drilling fluid having calcium soaps dispersed therein.

The powdered lubricant of the present invention is particularly effective in a drilling mud composition that contains monovalent or divalent ions enough to react with the lubricating additive and form dispersible and non-greasing type insoluble soaps.

This invention also contemplates inert filler acting as a dispersing agent to avoid formation of greasing and cheesing.

The present invention helps in dispersion and avoidance of greasing thereby eliminating the conventional use of surfactants.

It is an object of the invention to provide powdered lubricant additives for oil field application.

It is another object of the invention to provide powdered lubricant additives for drilling operation.

It is yet another object of the invention to provide powdered lubricant additives for water based drilling fluid.

It is yet another object of the invention to provide powdered lubricant additives for water based drilling fluid containing inorganic salts.

It is a further object of the invention to provide powdered lubricant additives for water based drilling fluid containing divalent cations.

It is yet another object of the invention provide powdered lubricant additives which are dispersible in divalent ions without cheesing and greasing.

It is yet another object of the invention to provide powdered lubricant additives that eliminates the use of surfactants to avoid greasing of water based drilling fluids.

It is yet another object of the invention to provide powdered lubricant additives which are essentially free from fatty esters and metal soap.

It is yet another object of the invention to provide powdered lubricant additives which are stable under pressure.

It is yet another object of the invention to provide powdered lubricant additives which obviate the deficiency of conventional solid lubricants due to high surface area.

It is yet another object of the invention to provide powdered lubricant additives that do not need to be used in large quantities thereby reducing the cost of production of the drilling fluid.

It is yet another object of the invention to provide powdered lubricant additives which overcome the disadvantage of liquid lubricants, such as handling in cold weather and logistic and environmental impacts.

Such objects are not considered to be exclusive objects and may, in some cases, be optional.

DETAILED DESCRIPTION OF THE INVENTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Many compositions can be prepared according to this invention. It is contemplated that the ratios of the liquid additives to inert filler can vary depending upon final use and method of preparation. Ratios of inert filler to the liquid additive in the powdered lubricant may vary from 10:90 to 90:10. It is noted that the lubricant and inert filler just added separately in the water based drilling fluid will still result in greasing.

The present invention envisages a powdered lubricant additive that does not grease or cheese out in the presence of mono, di or trivalent ions in water based drilling fluids. The powdered lubricant is made of (a) fatty acid that is essentially free from fatty acid ester and metal soap and (b) inert filler. The fatty acids are organic acids containing C10-C24 alkyl groups fatty acids which may be chosen from saturated and unsaturated fatty acids or vegetable oil fatty acid or sulfurized vegetable fatty acids or combinations thereof. The inert filler may be chosen from precipitated silica of particle size about 10-180 microns or diatomaceous earth of particle size about 10-200 microns or expanded perlite of particle size about 10-5000 microns or combinations thereof. Preferably, the ratio of the liquid additive to the inert filler in the powdered lubricant varies from 30:70 to 70:30.

The present invention further envisages a water-based drilling fluid having lubricating properties and made up of water, viscosifiers, weighing agents, fluid loss control agents, calcium ions and the powdered lubricant additive of the present invention in concentrations of about 0.25% to about 5% weight/volume of drilling fluid. Preferably the calcium ions are present in concentrations greater than 150 parts per million. Preferably, the powdered lubricant additive is present in concentrations of about 1% to about 3% weight/volume of drilling fluid. The viscosifier may be chosen from bentonite, xanthan gum, clay or polymers. The weighing agent may be barite or hematite or calcium carbonate. The fluid loss reducer may be chosen from starch, carboxy methylated starch, polyanionic cellulose or polymeric fluid loss additive.

The present invention also envisages a rotary method for drilling a well through calcium-containing formations in which the water based drilling fluid of this invention having calcium soaps dispersed therein is circulated down the well and back to the surface and contacted with the drill bits.

Some of the embodiments according to the invention are described as under.

Embodiment I: In one embodiment, the present invention is a method of preparing a solid lubricant which is used as an extreme pressure lubricant in water based drilling mud. The method comprises spraying liquid extreme pressure lubricant at temperature of about 70-150° C. on inert filler at the rate of about 2-8 LPM.

The method of preparing the solid lubricant involves spraying heated liquid lubricant comprising of a blend of (1) sulfurized fatty acid (2) non-sulfurized fatty acid and (3) a hydrocarbon on inert solid filler, such as precipitated silica of particle size 10-180 μm, diatomaceous earth of particle size 10-200 μm or expanded perlite of particle size 10-5000 μm. The mixture is blended, dried and cooled to obtain the solid lubricant which is further pulverized to particle size of about 500 μm to provide the dried lubricant powder.

An illustrative example of a liquid lubricant is Gel EP Torque Reducer which is commercially available from GUMPRO Drilling Fluids Pyt Ltd.

Embodiment II: Another embodiment of the present invention is a process for preparing solid general purpose lubricant additive. The method comprises spraying liquid lubricant additive at temperature of about 70-150° C. on inert fillers at the rate of about 2-8 LPM.

The method of preparing the solid lubricant additive involves spraying lubricant additive consisting of blend of (1) non-sulfurized vegetable oil and (2) hydrocarbon on inert solid filler such as precipitated silica of particle size 10-180 μm, diatomaceous earth of particle size 10-200 μm & expanded perlite of particle size 10-5000 μm. The method further comprises blending, drying and cooling the mixture to obtain the solid lubricant additive which is further pulverized to particle size of about 500 μm to provide the lubricant additive powder.

A commercially available liquid General Purpose Liquid Lubricant additive is Gel GP Lube from GUMPRO Drilling Fluids Pvt. Ltd.

In the present invention lubricant additives are added in the drilling muds in concentration ranging from about 0.25%-3.0%.

The monovalent or divalent ions causing the formation of the insoluble curds of monovalent or divalent soaps may be added to the drilling mud to give the desired properties. Divalent ions may also have been introduced into the drilling mud as a contaminant as result of penetrating formations or encountering brines.

Laboratory experiments were carried out on drilling mud compositions to determine the effectiveness of dispersants in drilling muds containing monovalent and divalent ions. The test procedure was to prepare a drilling mud and dose it separately with conventional liquid lubricant and the powdered lubricant of the present invention. The resultant drilling mud was tested in each case. The percentage lubricity/torque reduction and greasing out of monovalent and divalent ions was observed for the conventional liquid lubricants and the powdered lubricants of the present invention.

The improved and advantageous properties of the powdered lubricants of the invention are effectively demonstrated by the experiments reported in the ensuing examples. The following terms/abbreviations are used in describing the results of experimentation are explained as follows:

"EPTR" is Extreme Pressure Torque Reducer

"Liquid EPTR" is conventional Liquid Extreme Pressure Lubricant

"Powder EPTR" is powdered Extreme Pressure Lubricant of the present invention.

"GP Lube" is General Purpose Lubricant.

"AHR" is After Hot Rolling temperature.

"Powder GP LUBE" is Powdered General Purpose Lubricant additive of the present invention.

"Liquid GP LUBE" is conventional Liquid General Purpose Lubricant.

EXAMPLE 1: KCl MUD SYSTEM

MUD FORMULATION
Hot Rolling For Four Hrs @ 150° F. and 250° F.
KCl System
Base Mud Formulation

| Sr. No. | Product | Specific Gravity | Gms | Ml | Wt % |
|---|---|---|---|---|---|
| 1 | Pac LV | 1.6 | 2 | 1.25 | 0.36 |
| 2 | Xanthan Gum | 1.6 | 1.2 | 0.75 | 0.21 |
| 3 | Starch | 1.6 | 2 | 1.25 | 0.36 |
| 4 | CaCO3-50 | 2.6 | 8.45 | 3.25 | 0.93 |
| 5 | KCl | 2.47 | 104.39 | 40.15 | 11.47 |
| 6 | Monoethanol Amine | 1.00 | 0.35 | 0.35 | 0.10 |
| 7 | Biocide | 1.00 | 0.35 | 0.35 | 0.10 |
| 8 | Fresh Water | 1 | 302.654 | 302.654 | 86.47 |
| | Total | | 421.4 | 350.0 | 100.00 |

Lubricity and Greasing for the above mud system is studied for 1%, 2% and 3% lubricant dosage.

1. Comparison of the Lubricity and Greasing of Liquid V/s Powder Extreme Pressure Torque Reducer(EPTR):—

| | % Reduction in Lubricity Coefficient | | | | | |
|---|---|---|---|---|---|---|
| | LIQUID EPTR 1% Dosage | POWDER EPTR 1% Dosage | LIQUID EPTR 2% Dosage | POWDER EPTR 2% Dosage | LIQUID EPTR 3% Dosage | POWDER EPTR 3% Dosage |
| AHR-150° F. | 80.69 | 24.02 | 76.97 | 59.52 | 79.26 | 62.86 |
| AHR-250° F. | 80.69 | 78.74 | 76.97 | 76.02 | 77.04 | 74.58 |
| | Observation on greasing | | | | | |
| | Greasing Observed | No Greasing | Greasing Observed | No Greasing | Greasing Observed | No Greasing |

Conclusion:—

The lubricity of Powder EPTR which is the powdered lubricant of the present invention, increases with increase in dosage at Hot Rolling Temp of 150° F. whereas at 250° F. the lubricity of the Powdered lubricant is comparable to that of Liquid Lubricant. It is observed that the inert filler acts as a good dispersing agent and the powdered lubricant of the present invention prevents greasing out in the drilling mud.

2. Comparison of the Lubricity and Greasing of Liquid V/s Powder General Purpose(GP) Lube:—

| | % Reduction in Lubricity Coefficient | | | | | |
|---|---|---|---|---|---|---|
| | LIQUID GP LUBE | POWDER GP LUBE | LIQUID GP LUBE | POWDER GP LUBE | LIQUID GP LUBE | POWDER GP LUBE |
| | 1% Dosage | | 2% Dosage | | 3% Dosage | |
| AHR-150° F. | 76.96 | 70.24 | 80.6 | 75.00 | 78.18 | 68.59 |
| AHR-250° F. | 76.25 | 71.43 | 80.74 | 82.85 | 81.48 | 76.84 |
| | Observation on Greasing | | | | | |
| | Greasing Observed | No Greasing | Greasing Observed | No Greasing | Greasing Observed | No Greasing |

Conclusion:—

The lubricity of Powder GP Lube which is the powdered general purpose lubricant of the present invention, is comparable to conventional liquid general purpose lubricant. Inert filler acts as a good dispersing agent and greasing is not observed when the powdered general purpose lubricant of the present invention is used.

EXAMPLE 2: $CaCl_2$ MUD SYSTEM

MUD FORMULATION
Hot Rolling For Four Hrs @ 150° F. and 250° F.
CaCl2 System
Base Mud Formulation

| Sr. No. | Product | Specific Gravity | Gms | ml | Wt % |
|---|---|---|---|---|---|
| 1 | Pac LV | 1.6 | 2 | 1.25 | 0.4 |
| 2 | Tap Water | 1 | 285.897 | 269.3782 | 77.0 |
| 3 | CaC12 | 3.1 | 183.465 | 59.179 | 16.9 |
| 4 | Xanthan Gum | 1.6 | 1.2 | 0.75 | 0.2 |
| 5 | Starch | 1.60 | 2 | 1.25 | 0.4 |
| 6 | Calcium carbonate 50 | 2.6 | 4.239 | 17.69231 | 5.1 |
| 7 | Monoethanol Amine | 1 | 0.35 | 0.35 | 0.1 |
| 8 | Biocide | 1 | 0.35 | 0.5 | 0.1 |
| | Total | | 479.2 | 350.0 | 100 |

Lubricity and Greasing for the above mud system is studied for 1%, 2% and 3% lubricant dosage.

1. Comparison of the Lubricity and Greasing of Liquid V/s Powder Extreme Pressure Torque Reducer(EPTR) is:—

| | % Reduction in Lubricity Coefficient | | | | | |
|---|---|---|---|---|---|---|
| | LIQUID EPTR | POWDER EPTR | LIQUID EPTR | POWDER EPTR | LIQUID EPTR | POWDER EPTR |
| | 1% Dosage | | 2% Dosage | | 3% Dosage | |
| AHR-150° F. | 27.43 | 37.07 | 73.45 | 38.58 | 76.11 | 40.94 |
| AHR-250° F. | 29.34 | 29.89 | 75.00 | 40.22 | 78.26 | 42.52 |
| | Observation on Greasing | | | | | |
| | Greasing Observed | No Greasing | Greasing Observed | No Greasing | Greasing Observed | No Greasing |

Conclusion:—At 1% dosage, the lubricity of conventional liquid lubricant is comparable to that of the powdered extreme pressure lubricant of the present invention. At 2% and 3% dosage, the lubricity of the powdered lubricant is less than that of liquid lubricant. However, the inert filler acts as a good dispersing agent and greasing is not observed when the powdered extreme pressure lubricant is used.

2. Comparison of the Lubricity and Greasing of Liquid V/s Powder GP Lube:—

| | % Reduction in Lubricity Coefficient | | | | | |
|---|---|---|---|---|---|---|
| | LIQUID GP LUBE | POWDER GP LUBE | LIQUID GP LUBE | POWDER GP LUBE | LIQUID GP LUBE | POWDER GP LUBE |
| | 1% Dosage | | 2% Dosage | | 3% Dosage | |
| AHR-150° F. | 40.71 | 29.20 | 30.97 | 27.43 | 26.55 | 23.01 |
| AHR-250° F. | 9.78 | 40.22 | 7.60 | 41.30 | 3.26 | 39.13 |
| | Observation on Greasing | | | | | |
| | Greasing Observed | No Greasing | Greasing Observed | No Greasing | Greasing Observed | No Greasing |

Conclusion:—

Lubricity of Powder GP Lube which is the powdered general purpose lubricant of the present invention, is greater than that of conventional Liquid General Purpose lubricant at Hot Rolling Temperature of 250° F., whereas at 150° F. it is comparable to that of the conventional Liquid General Purpose lubricant. Further, the lubricity remains consistent with varying dosages used. However, there is no greasing observed in the powdered general purpose lubricant since the inert filler acts a good dispersing agent.

EXAMPLE 3: NaCl MUD SYSTEM

MUD FORMULATION
Hot Rolling For Four Hrs @ 150° F. and 250° F.
NaCl System
Base Mud Formulation

| Sr. No. | Product | Specific Gravity | Gms | Ml | Wt % |
|---|---|---|---|---|---|
| 1 | Pac LV | 1.6 | 2 | 1.25 | 0.36 |
| 2 | Xanthan Gum | 1.6 | 1.2 | 0.75 | 0.21 |
| 3 | Starch | 1.6 | 2 | 1.25 | 0.36 |
| 4 | CaCO3-50 | 2.6 | 8.434 | 3.24 | 0.93 |
| 5 | NaCl | 2.79 | 97.054 | 34.792 | 9.94 |
| 6 | Fresh Water | 1.00 | 308.714 | 308.71 | 88.20 |
| | Total | | 419.4 | 350.0 | 100.00 |

1. Comparison of the Lubricity and Greasing of Liquid V/s Powder Extreme Pressure Torque Reducer(EPTR):—

| | % REDUCTION IN LUBRICITY COEFFICIENT | | | | | |
|---|---|---|---|---|---|---|
| | LIQUID EPTR | POWDER EPTR | LIQUID EPTR | POWDER EPTR | LIQUID EPTR | POWDER EPTR |
| | 1% Dosage | | 2% Dosage | | 3% Dosage | |
| AHR-150° F. | 76.0 | 77.2 | 80.0 | 72.0 | 79.5 | 74.4 |
| AHR-250° F. | 77.6 | 79.6 | 82.9 | 79.1 | 82.9 | 92.8 |
| Observation on greasing | | | | | | |
| | No Greasing | No Greasing | No Greasing | No Greasing | No Greasing | No Greasing |

Conclusion:—

Lubricity of the powdered extreme pressure lubricant of the present invention is comparable to conventional Liquid extreme pressure lubricant.

2. Comparison of the Lubricity and Greasing of Liquid V/s Powder General Purpose(GP) Lube is:—

| | % Reduction in Lubricity Coefficient- POWDER GP LUBE | | | | | |
|---|---|---|---|---|---|---|
| | LIQUID GP LUBE | POWDER GP LUBE | LIQUID GP LUBE | POWDER GP LUBE | LIQUID GP LUBE | POWDER GP LUBE |
| | 1% Dosage | | 2% Dosage | | 3% Dosage | |
| AHR-150° F. | 82.29 | 60 | 83.42 | 78.49 | 84.00 | 83.87 |
| AHR-250° F. | 82.19 | 75 | 84.25 | 80.00 | 84.93 | 81.25 |
| Observation on Greasing | | | | | | |
| | No Greasing | No Greasing | No Greasing | No Greasing | No Greasing | No Greasing |

Conclusion:—

Lubricity of Powdered general purpose lubricant of the present invention is comparable to conventional general purpose lubricant.

The foregoing description of preferred embodiments of the present disclosure provides illustration and description, but is not intended to be exhaustive or to limit the disclosure to the precise form disclosed. Modifications and variations are possible in light of the above teachings or may be acquired from practice of the disclosure.

We claim:

1. A powdered lubricant additive, comprising:
    a fatty acid that is free from fatty acid ester and metal soap, said fatty acid comprising organic acids containing C10-C24 alkyl groups fatty acids, wherein the fatty acid is present in a range of about 50% to 70% by weight of the additive; and
    an inert filler, wherein the inert filler is selected from the group consisting of precipitated silica of particle size about 10-180 microns, diatomaceous earth of particle size about 100-130 microns, expanded perlite of particle size about 10-5000 microns, and combinations thereof, and the inert filler is present in the range of about 30% to 50% by weight of the additive,
    wherein the powdered lubricant additive does not grease or cheese out in the presence of mono, di or trivalent ions in water based drilling fluids, and the powdered lubricant additive is free from fatty acid ester and metal soap.

2. The powdered lubricant additive as claimed in claim 1 wherein the C10-C24 alkyl group fatty acids are selected from the group consisting of saturated and unsaturated fatty acids, vegetable oil fatty acid, sulfurized vegetable fatty acids or combinations thereof.

3. The powdered lubricant additive as claimed in claim 1 further comprising a hydrocarbon.

4. A water-based drilling fluid having lubricating properties comprising water, viscosifiers, weighing agents, fluid loss control agents and the powdered lubricant additive as claimed in claim 1 and having calcium ions present in concentration greater than 150 parts per million.

5. The water-based drilling fluid as claimed in claim 4 wherein the powdered lubricant additive is present in concentrations of about 0.25% to about 5% weight/volume of drilling fluid, effective to impart lubricity and disperse calcium soaps in the drilling fluid.

6. The water-based drilling fluid as claimed in claim 5 wherein the powdered lubricant additive is present in concentrations of about 1% to about 3% weight/volume of drilling fluid.

7. The water-based drilling fluid as claimed in claim 4 wherein:
    a. the viscosifier is selected from the group consisting of bentonite, xanthan gum, clay and polymers;
    b. the weighing agent is selected from the group consisting of barite, hematite and calcium carbonate; and
    c. the fluid loss reducer is selected from the group consisting of starch, carboxy methylated starch, polyanionic cellulose, polymeric fluid loss additive.

8. A rotary method for drilling a well from a surface through calcium-containing formations in which the water based drilling fluid as claimed in claim 4 is circulated down the well and back to the surface, and contacted with drill bits within the well, said drilling fluid having calcium soaps dispersed therein.

* * * * *